(12) United States Patent
Chen

(10) Patent No.: US 6,965,208 B2
(45) Date of Patent: Nov. 15, 2005

(54) MOTOR SPEED DETECTING DEVICE FOR USE BETWEEN MOTOR AND SYSTEM

(75) Inventor: Chuan-Fa Chen, Taipei (TW)

(73) Assignee: Twinhead International Corp. (TW)

( * ) Notice: Subject to any disclaimer, the term of this patent is extended or adjusted under 35 U.S.C. 154(b) by 0 days.

(21) Appl. No.: 10/682,064

(22) Filed: Oct. 8, 2003

(65) Prior Publication Data

US 2005/0077849 A1 Apr. 14, 2005

(51) Int. Cl.$^7$ ................................................. G01P 3/44
(52) U.S. Cl. ..................... 318/490; 388/907.5; 388/909
(58) Field of Search ..................... 318/490; 388/907.5, 388/909

(56) References Cited

U.S. PATENT DOCUMENTS

| | | | | |
|---|---|---|---|---|
| 3,942,114 A | * | 3/1976 | Keeling | 324/177 |
| 4,114,075 A | * | 9/1978 | Minakuchi | 388/820 |
| 4,207,504 A | * | 6/1980 | Kawada et al. | 318/561 |
| 4,338,552 A | * | 7/1982 | Pilz et al. | 318/266 |
| 4,342,950 A | * | 8/1982 | Kohzai et al. | 318/611 |
| 4,527,101 A | * | 7/1985 | Zavis et al. | 318/245 |
| 6,628,519 B2 | * | 9/2003 | Umetsu | 361/687 |
| 6,665,163 B2 | * | 12/2003 | Yanagisawa | 361/103 |
| 6,777,900 B2 | * | 8/2004 | Lee | 318/268 |
| 6,815,916 B2 | * | 11/2004 | Horng et al. | 318/138 |

* cited by examiner

Primary Examiner—Bentsu Ro

(57) ABSTRACT

A motor speed detecting device for use between a motor and a system is provided. A motor speed detecting device for use between a motor and a system includes a first input terminal and a second input terminal, wherein the first and second input terminals are electrically connected respectively to a constant voltage potential and a ground potential for continuously receiving an electrical power; and a third input terminal electrically connected between the motor and the system, wherein the third input terminal receives a control signal sent by the system for controlling a speed of the motor. A motor speed control method using in a motor speed detecting device between a motor and a system is also provided.

16 Claims, 9 Drawing Sheets

| duty cycle ratio | fan1 | fan2 | fan3 | fan4 | fan5 | fan6 |
|---|---|---|---|---|---|---|
| 100% | 5743 | 5602 | 5846 | 5662 | 5787 | 5732 |
| 96% | 5555 | 5511 | 5652 | 5568 | 5593 | 5634 |
| 92% | 5489 | 5353 | 5491 | 5405 | 5518 | 5468 |
| 88% | 5335 | 5197 | 5423 | 5250 | 5361 | 5399 |
| 84% | 5259 | 5124 | 5265 | 5180 | 5203 | 5239 |
| 80% | 5092 | 4967 | 5184 | 5017 | 5129 | 5079 |
| 76% | 4922 | 4800 | 5021 | 4850 | 4963 | 4990 |
| 72% | 4833 | 4708 | 4849 | 4760 | 4789 | 4820 |
| 68% | 4653 | 4532 | 4751 | 4582 | 4691 | 4718 |
| 64% | 4469 | 4427 | 4567 | 4476 | 4510 | 4530 |
| 60% | 4349 | 4236 | 4377 | 4285 | 4396 | 4340 |
| 56% | 4152 | 4040 | 4254 | 4088 | 4200 | 4212 |
| 52% | 4005 | 3902 | 4048 | 3950 | 3998 | 4001 |
| 48% | 3800 |  | 3900 |  |  | 3773 |

Fig. 6

| speed | fan1 | fan2 | fan3 | fan4 | fan5 | fan6 | operating frequency |
|---|---|---|---|---|---|---|---|
| 4000 | 7F | 89 | 7F | 87 | 84 | 84 | 266Hz |
| 4500 | A0 | A5 | 9B | A0 | 9D | 9D | 300Hz |
| 5000 | C0 | C8 | BB | C5 | BE | BE | 333Hz |
| 5500 | E6 | ED | E6 | EB | E3 | E6 | 366Hz |

Fig. 7

MOTOR SPEED DETECTING DEVICE FOR USE BETWEEN MOTOR AND SYSTEM

FIELD OF THE INVENTION

The present invention is related to a motor speed detecting device, and more particularly, to a motor speed detecting device for use between a motor and a system.

BACKGROUND OF THE INVENTION

Nowadays, the integration degree in electronic ICs is more and more increased and developed. Heat dissipating has become the most important problem in all the electronic devices. Take portable computer as an example, the heat generated from the high speed processing ICs will critically affect the stability of the system, if heat can't be well dissipated. Therefore, the fan inside the computer is so-called the active dissipating element, which is the most useful and basic requirement for the portable computer. Please refer to FIG. 1. FIG. 1 illustrates a schematic block diagram of the foregoing fan controlled by a pulse width modulated (PWM) signal for heat dissipating. The main elements are the fan motor 10 and the speed output module 11. When the system between the first terminal 101 (power source) and the second terminal 102 (ground potential) of the fan motor 10 provides a PWM signal (as shown in FIG. 2(*a*)), the fan motor 10 changes its speed in response to the frequency and the duty cycle of the PWM signal, and then the speed output module 11 outputs a square wave signal (as shown in FIG. 2(*b*)) in response to the speed of the fan motor 10. The frequency of the square wave signal is proportional to the speed. According to the arrangement of the electronic devices illustrated by FIG. 1, the speed output module 11 is powered by the PWM signal. Thereby, the speed output module 11 outputs the square wave signal only when the PWM signal is active. In other words, the speed variation of the fan can't be monitored in the whole process. For the system which changes the duty cycle of the PWM signal corresponding to the fan speed and the ambient temperature, errors might be generated because of the inaccuracy resulted from the unstable monitoring time. That will affect the control of the fan speed in the system, and it will be very difficult to get a balance among the heat dissipating efficiency, energy consumption, and the noise generated from the fan.

From the above description, it is known that the conventional motor speed detecting device is not very practical when the user needs to precisely control the fan speed in the whole process. It is needed in the industry that an apparatus that is designed for detecting the fan speed allows the fan to be precisely controlled by the system in the whole process.

SUMMARY OF THE INVENTION

It is the main object of the present invention to provide a motor speed detecting device for use between a motor and a system.

It is another object of the present invention to provide a motor speed detecting device to monitor the fan speed in the whole process.

It is another object of the present invention to provide a motor speed detecting device to control the fan speed more precisely.

According to one aspect of the present invention, the motor speed detecting device for use between a motor and a system includes a first input terminal and a second input terminal, wherein the first and second input terminals are electrically connected respectively to a constant voltage potential and a ground potential for continuously receiving an electrical power; and a third input terminal electrically connected between the motor and the system, wherein the third input terminal receives a control signal sent by the system for controlling a speed of the motor.

Preferably, the motor is a fan motor and the system is a portable computer

Preferably, the control signal is a PWM (pulse width modulation) signal.

Preferably, the motor speed detecting device further includes a speed output module electrically connected between the first input terminal and the second input terminal for continuously generating a speed signal in response to the speed of the motor; and a speed output terminal electrically connected between the speed output module and the system for outputting the speed signal to the system.

According to another aspect of the present invention, the motor speed control method using in a motor speed detecting device between a motor and a system, wherein the system outputs a PWM signal to the motor for controlling the speed, includes steps of: setting a first predetermined speed of the motor and finding a first frequency of the PWM signal corresponding to the first predetermined speed, wherein the first frequency is a multiple of the first predetermined speed; processing a learning process to the motor, wherein the system inputs PWM signals having a constant testing frequency but different duty cycles one by one to the motor and records the speed in response to the different duty cycles for finishing a table recoding a relationship between the duty cycles and the speed; and finding a first duty cycle according to the first predetermined speed and the table, and then the system outputting a PWM signal having the first frequency and the first duty cycle to the motor so that the motor works at the first predetermined speed.

Preferably, the testing frequency is not equal to one of the first frequency and a multiple of the first frequency.

Preferably, the method further includes steps of: setting a second predetermined speed of the motor and finding a second frequency of the PWM signal corresponding to the second predetermined speed, wherein the second frequency is a multiple of the second predetermined speed; and finding a second duty cycle according to the second predetermined speed and the table, and then the system outputting a PWM signal having the second frequency and the second duty cycle to the motor so that the motor works at the second predetermined speed.

Preferably, the testing frequency is not equal to one of the second frequency and a multiple of the second frequency.

Preferably, in the learning process, the system inputs PWM signals having a fixed testing frequency and duty cycles decreasing 4% each time from 100% to the motor one by one and records the speed in response to the duty cycles for finishing a table recording a relationship between the duty cycles and the speed.

Preferably, the motor is a fan motor and the system is a portable computer.

According to another aspect of the present invention, the heat dissipating device for a chip of a system includes: a heat sink connected to a surface of the chip for enhancing a heat dissipating efficiency of the chip; a fan driven by a control signal outputted by the system for speeding an air flow around the heat sink; a first input terminal and a second input terminal, wherein the first and second input terminals are electrically connected respectively to a constant voltage potential and an ground potential for continuously receiving an electrical power; a third input terminal electrically connected between the fan and the system, wherein the third input terminal receives the control signal sent by the system for controlling a speed of the fan.

Preferably, the system is a portable computer.

Preferably, the control signal is a PWM (pulse width modulation) signal.

Preferably, the heat dissipating device further includes: a speed output module electrically connected between the first input terminal and the second input terminal for continuously generating a speed signal in response to the speed of the fan; and a speed output terminal electrically connected between the speed output module and the system for outputting the speed signal to the system.

According to another aspect of the present invention, the method of controlling a fan speed includes steps of: setting a first predetermined speed of the fan and finding a first frequency of the PWM signal corresponding to the first predetermined speed, wherein the first frequency is a multiple of the first predetermined speed; processing a learning process to the fan, wherein the system inputs PWM signals having a constant testing frequency but different duty cycles one by one to the fan and records the speed in response to the different duty cycles for finishing a table recoding a relationship between the duty cycles and the speed; and finding a first duty cycle according to the first predetermined speed and the table, and then the system outputting a PWM signal having the first frequency and the first duty cycle to the fan so that the fan works at the first predetermined speed.

Preferably, the testing frequency is not equal to one of the first frequency and a multiple of the first frequency.

Preferably, the method further includes steps of: setting a second predetermined speed of the fan and finding a second frequency of the PWM signal corresponding to the second predetermined speed, wherein the second frequency is a multiple of the second predetermined speed; and finding a second duty cycle according to the second predetermined speed and the table, and then the system outputting a PWM signal having the second frequency and the second duty cycle to the fan so that the fan works at the second predetermined speed.

Preferably, the test frequency is not equal to one of the second frequency and a multiple of said second frequency.

Preferably, in the learning process, the system inputs PWM signals having a fixed testing frequency and duty cycles decreasing 4% each time from 100% to the fan one by one and records the speed in response to the duty cycles for finishing a table recording a relationship between the duty cycle and the speed.

The foregoing and other features and advantages of the present invention will be more clearly understood through the following descriptions with reference to the drawings, wherein:

BRIEF DESCRIPTION OF THE DRAWINGS

FIG. 6 illustrates a table of the duty cycle ratio corresponding to the speed obtained from the speed controlling method according to a preferred embodiment of the present invention;

FIG. 7 illustrates a table listing of the predetermined speed corresponding to the frequency and the duty cycle ratio of the PWM signal according to a preferred embodiment of the present invention;

DETAILED DESCRIPTION OF THE PREFERRED EMBODIMENT

Figure 1:
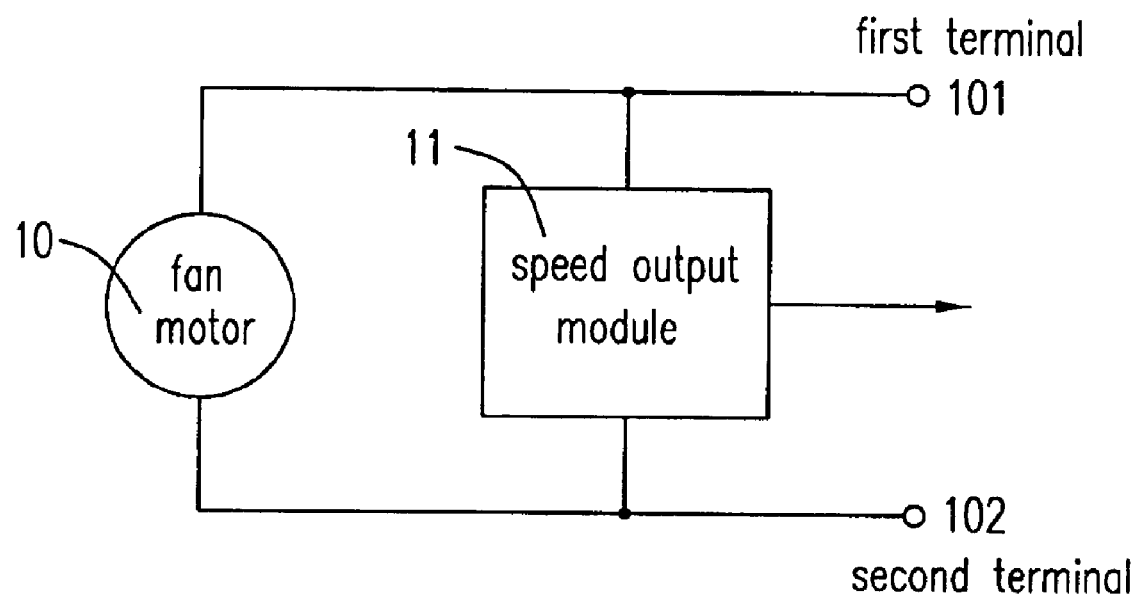
FIG. 1 illustrates a schematic block diagram of the conventional fan controlled by a PWM signal for heat dissipating according to the prior art.
Figure 2:
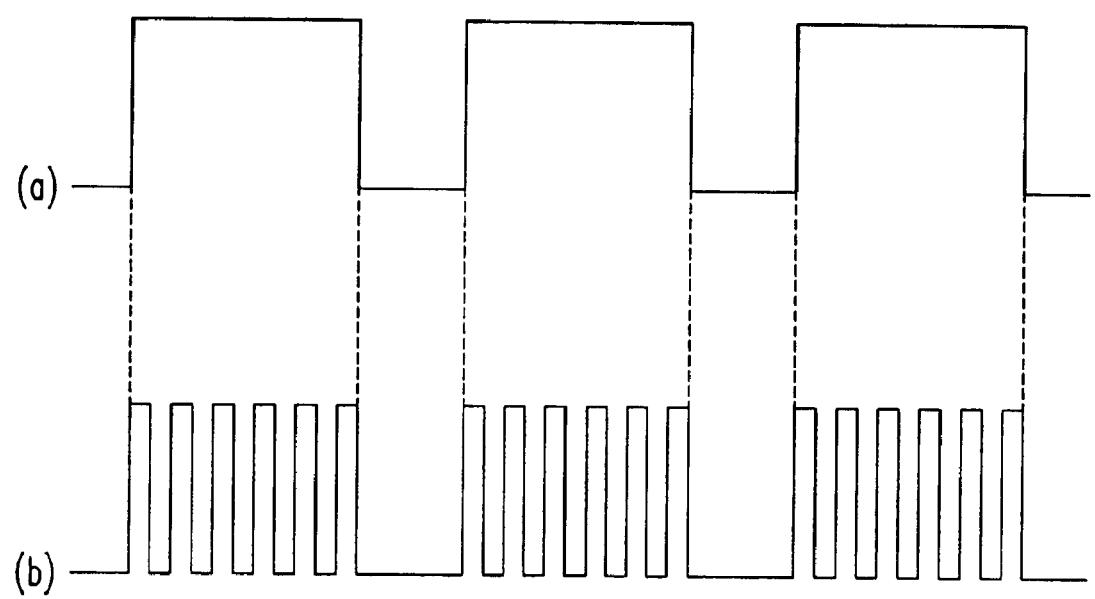
FIG. 2 illustrates a plot of a PWM signal versus the square wave signal outputted by the conventional speed output module according to the prior art.
Figure 3:
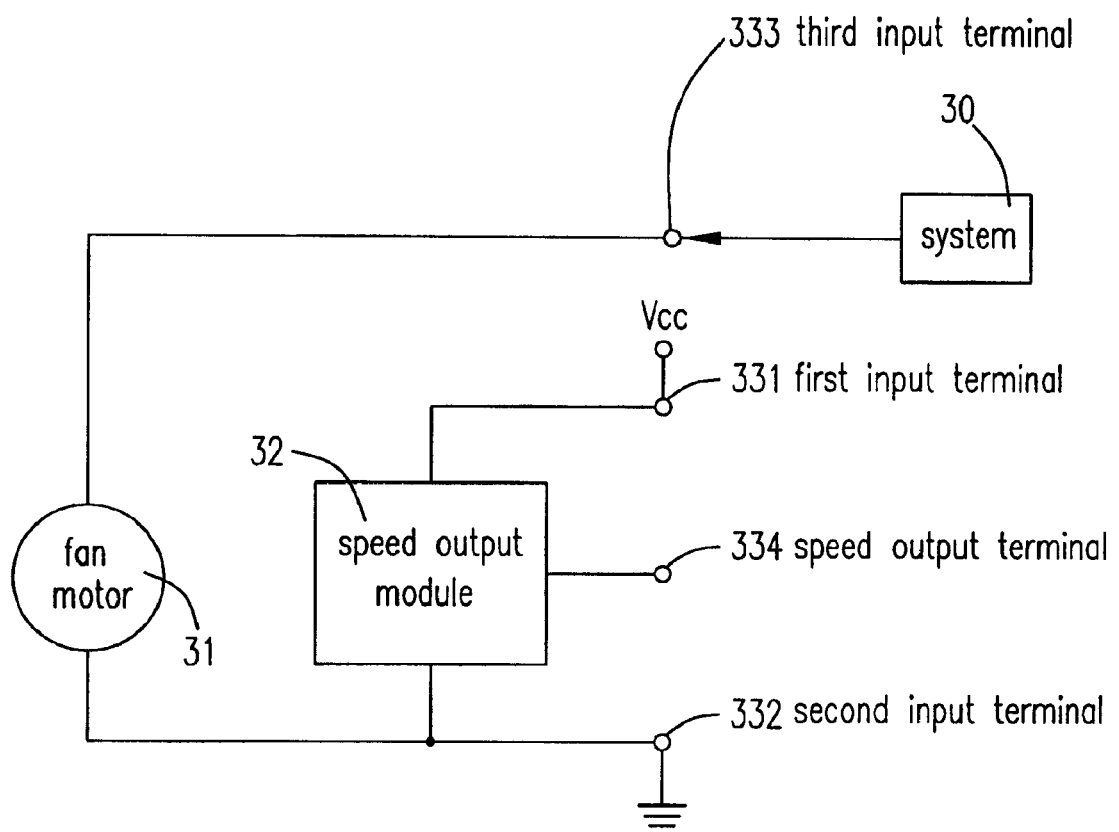
FIG. 3 illustrates a schematic block diagram of a motor speed detecting device according to a preferred embodiment of the present invention.
Figure 4:
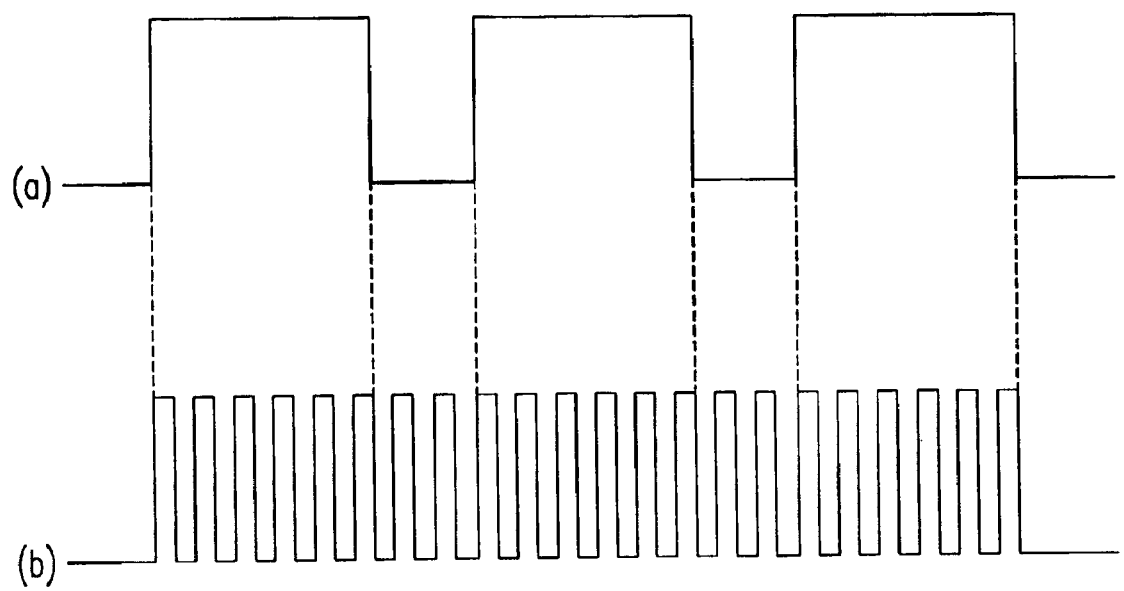
FIG. 4 illustrates a plot of a PWM signal versus the square wave signal outputted by the speed output module according to the present invention.

The present invention will be described more specifically with reference to the following embodiment. Please refer to FIG. 3. FIG. 3 illustrates a first preferred block diagram of a motor speed detecting device of the present invention. The speed detecting device includes the fan motor 31 and speed output module 32. The drawback in the prior art is that the conventional device can't output speed signal continuously. In the first preferred embodiment, the first input terminal 331 and the second input terminal 332 are electrically connected to a constant voltage source (Vcc) and a ground potential respectively so that the electricity is continuously provided. The third input terminal 333 receives the PWM signal (FIG. 4(a)) from the system 30 for further controlling the speed of the fan motor 31. That is, the speed output module 32 is not powered by the PWM signal, but powered by continuous electricity. Thereby, the speed output module 32 makes the speed output terminal 334 output a speed signal (FIG. 4(b)) to the system 30 continuously in response to the speed of the fan motor 31. Accordingly, the system 30 can control the fan speed accurately for monitoring the speed of the fan motor 31 in the whole process.

Figure 5:
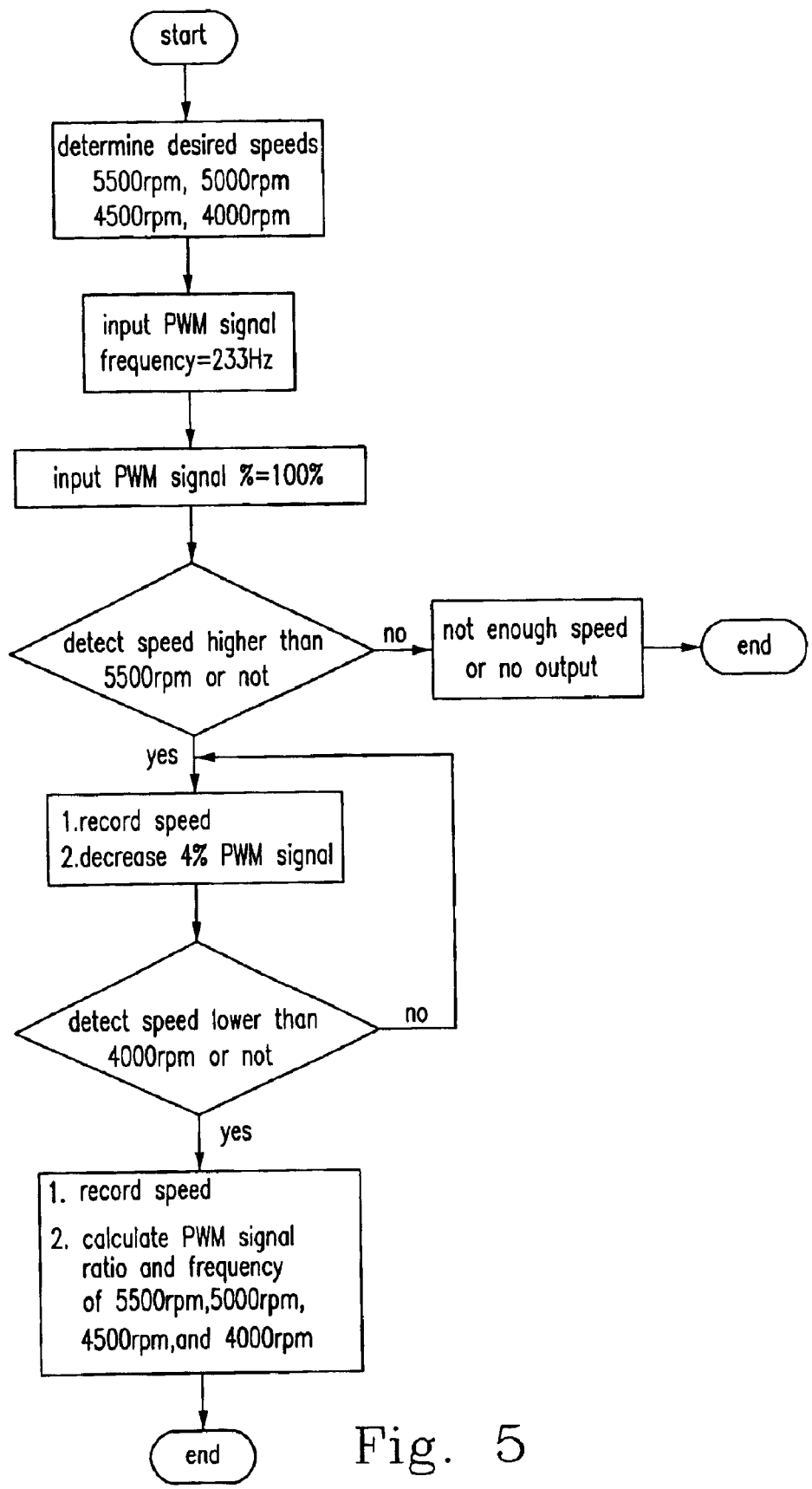
FIG. 5 illustrates a flow chart of the speed controlling method for the fan according to a preferred embodiment of the present invention.

Please refer to FIG. 5. FIG. 5 illustrates a preferred flow chart of speed controlling method according to the present invention. The method can applied to a booting process of a portable computer for establishing a compared table corresponding to the state of the fan so as to achieve the goal of controlling the fan speed accurately. First, a predetermined speed and a frequency of the PWM signal corresponding to the predetermined speed are determined according to the practical requirement. The practical requirement here means the needed balance between the heat dissipating ability and the generated noise. When the fan speed is high and the heat dissipating ability is good, the noise generated from the fan is loud. On the contrary, if the heat dissipating ability is bad, the noise is low. In this embodiment, the fan speed is set up at 5500 r.p.m., 5000 r.p.m., 4500 r.p.m., and 4000 r.p.m., which are frequencies 5500/60 Hz, 5000/60 Hz, 4500/60 Hz, and 4000/60 Hz respectively. Thereby, the frequencies of the PWM signal corresponding to the predetermined speed are multiples of 5500/60 Hz, 5000/60 Hz, 4500/60 Hz, and 4000/60 Hz.

A learning process is then performed. Before the learning process, it is needed to set up a testing frequency. The selection of the testing frequency is preferable not to choose from one of the four frequencies mentioned above and a multiple of those. In this case, the testing frequency is set at 233 Hz, and then the system 30 sends the PWM signal with a frequency of 233 Hz to the fan motor 31 for performing the learning process. In this embodiment, the frequencies roughly between 5500 r.p.m. and 4000 r.p.m. are recorded. The PWM signal having a constant frequency decreases 4% of duty cycle of the PWM signal from 100% in each cycle. Then the speeds are recorded in response to the duty cycle ratio of the PWM signal shown in FIG. 6. Due to each fan has different performance, each result corresponding to each fan may be different. (Six fans are tested respectively in this embodiment.) After the comparison table is obtained, the desired duty cycle ratio is caculated in response to the recorded speeds in the comparison table, such as 5500 r.p.m., 5000 r.p.m., 4500 r.p.m., and 4000 r.p.m., by the method of interpolation. The result of this case is listed in FIG. 7. (The numerals are converted to hex numerals) Finally, a proper PWM signal frequency is selected from a multiple of 5500/60 Hz, 5000/60 Hz, 4500/60 Hz, and 4000/60 Hz. As shown in FIG. 7, the four fan speeds (5500 r.p.m., 5000 r.p.m., 4500 r.p.m., and 4000 r.p.m.) are corresponding to 366 Hz, 333 Hz, 300 Hz, and 266 Hz. Therefore, by properly controlling the operating frequency of the PWM signal and duty cycle ratio, the fan speed can be set at a precise speed. For example, if we want to set the speed of the no. 1 fan motor at 5000 r.p.m., according to the tables in FIG. 6 and FIG. 7, the system outputs a PWM signal having a 333 Hz frequency and a duty cycle ratio 80% to 76% (the best value can be found by interpolation method). Accordingly, the speed of the no. 1 fan motor will keep constantly at 5000 r.p.m. so as to achieve the goal of controlling the speed accurately.

Figure 8:
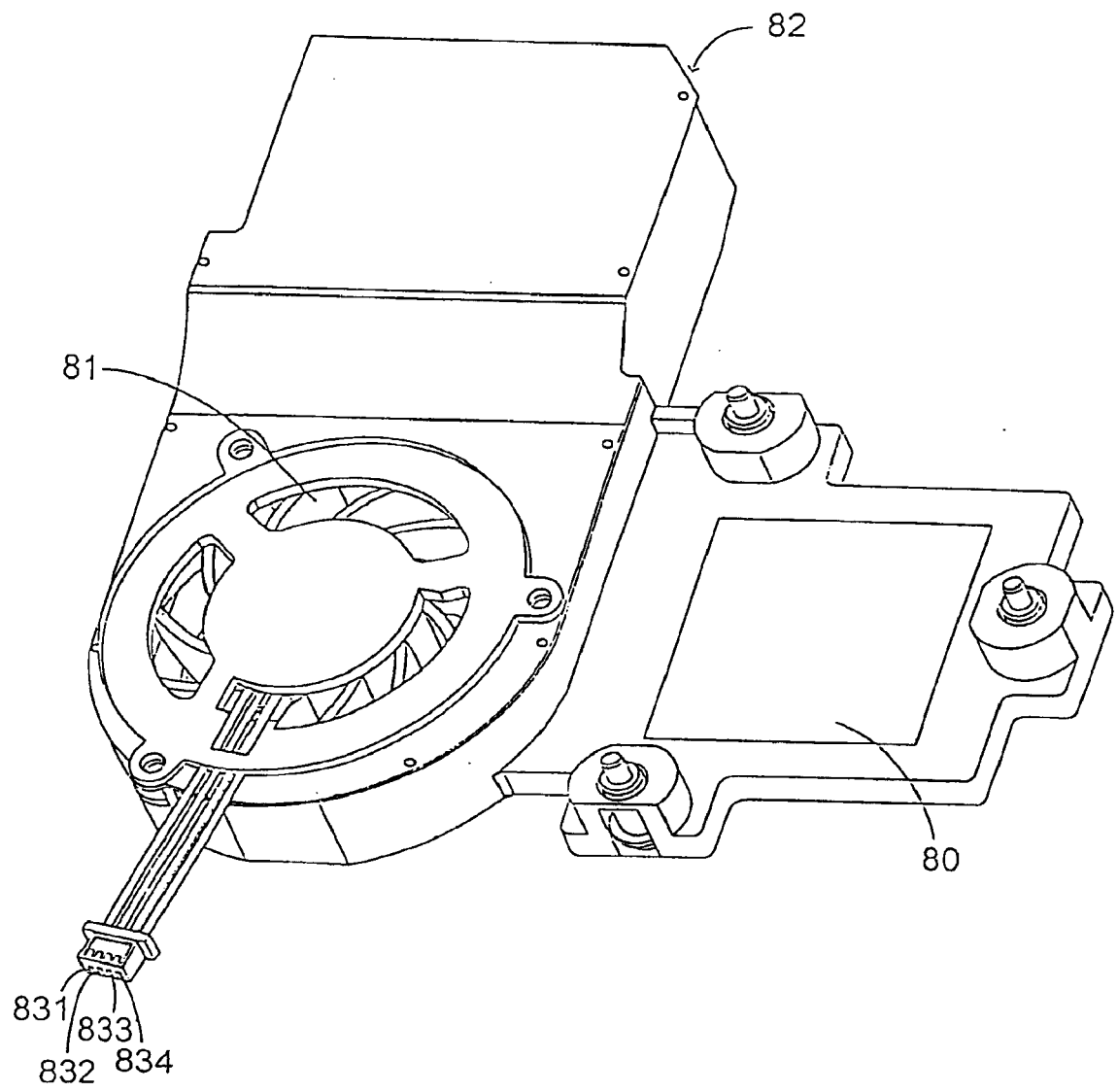
FIG. 8 illustrates a heat dissipating device mounted with a chip in a system according to another preferred embodiment of the present invention.

Please refer to FIG. 8. FIG. 8 illustrates a heat dissipating device mounted with a chip in a system according to a second preferred embodiment of the present invention. As shown in FIG. 8, the heat sink 80 is connected to a chip (not shown) for enhancing the efficiency of the heat dissipating. The fan 81 which is driven by a PWM signal transfers the air flow from the heat sink 80 to the outtake 82 speedily. There are four terminals in the heat dissipating device, the first input terminal 831, the second input terminal 832, the third input terminal 833, and the speed output terminal 834. Accordingly, the speed output module (as shown in FIG. 3) having a constant electrical power source provides the speed signal to the system continuously and accurately for processing the above speed controlling method.

Figure 9:
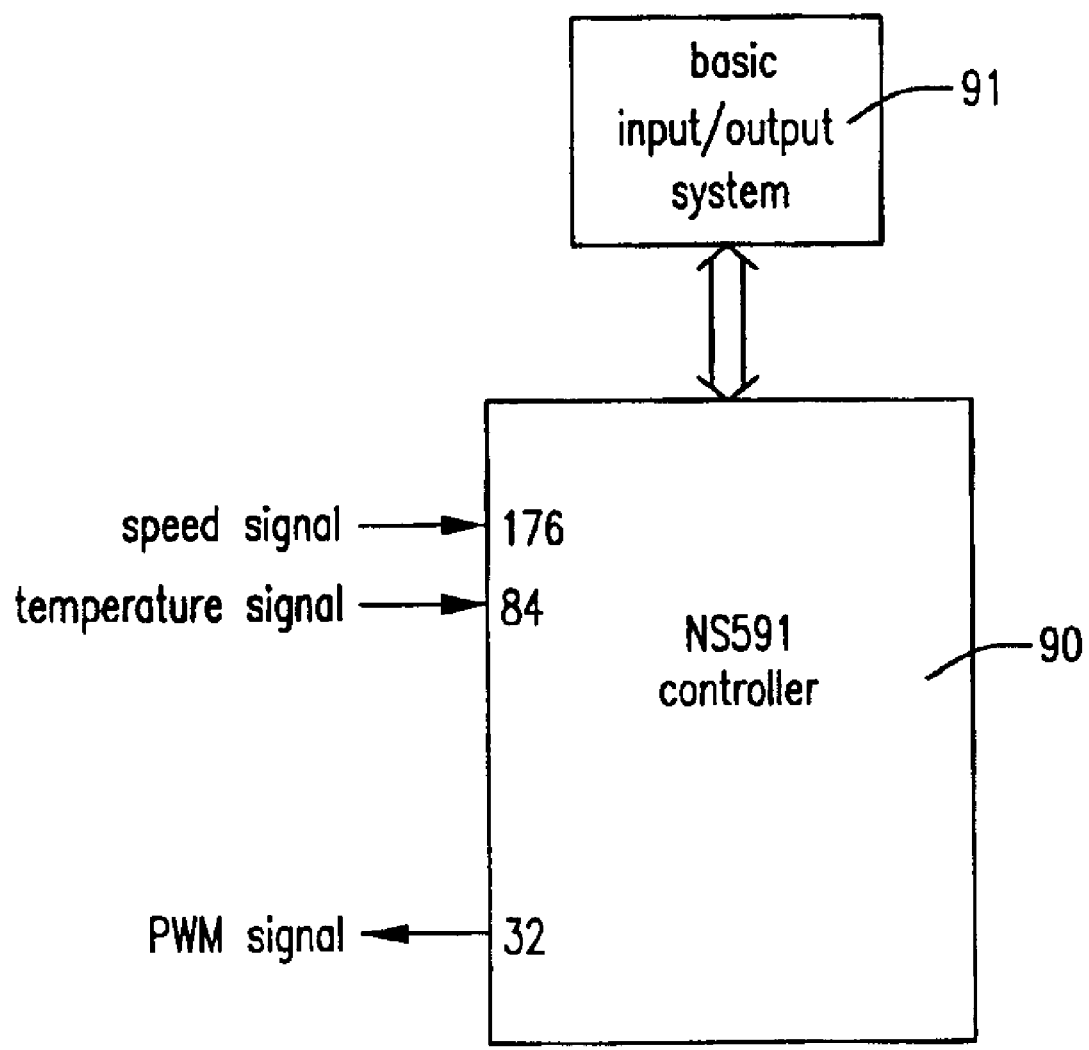
FIG. 9 illustrates a schematic block diagram of the heat dissipating device for a chip in a system disposed in a portable computer according to another preferred embodiment of the present invention.

Please refer to FIG. 9. FIG. 9 illustrates a schematic block diagram of the heat dissipating device for a chip in a system disposed in a portable computer according to another preferred embodiment of the present invention. The functions of the no. NS591 controller 90 are similar to those of the system 30. The pin 176 receives the speed signal from the speed output terminal 834 continuously, and the pin 84 receives the temperature signal representing the temperature around the chip. The controller 90 outputs a PWM signal corresponding to the temperature and the speed signal through the pin 32. The operating frequency of the PWM signal and the duty cycle ratio can be set according to the data stored in the no. NS591 controller 90 or the BIOS (basic input/output system) 91 (FIG. 7). Therefore, the learning process shown in FIG. 5 can even be accomplished by the no. NS591 controller 90, or the BIOS 91, or both of them.

According to the above, the motor speed detecting device of the present invention provides a constant voltage source to the speed output module which can output the fan speed signal continuously for the system to control the fan accurately. Besides, since the circuit rearrangement provided in the prior invention is easy to accomplish, the cost to achieve the aforesaid goal is low.

While the invention has been described in terms of what are presently considered to be the most practical and preferred embodiments, it is to be understood that the invention need not to be limited to the disclosed embodiment. On the contrary, it is intended to cover various modifications and similar arrangements included within the spirit and scope of the appended claims which are to be accorded with the broadest interpretation, so as to encompass all such modifications and similar structures. Accordingly, the invention is not limited by the disclosure, but instead its scope is to be determined entirely by reference to the following claims.

What is claimed is:

1. A motor speed detecting device for use between a fan motor and a computer, comprising:
   a first input terminal and a second input terminal, wherein said first and second input terminals are electrically connected respectively to a constant voltage potential and a ground potential for continuously receiving an electrical power; and
   a third input terminal electrically connected between said fan motor and said computer outputting a PWM signal by referring to a predetermined table recording a relationship between a duty cycle and a speed of said fan motor, wherein said third input terminal receives said PWM signal sent by said computer for controlling said speed of said fan motor.

2. The device according to claim 1, wherein said motor speed detecting device further comprises:
   a speed output module electrically connected between said first input terminal and said second input terminal for continuously generating a speed signal in response to said speed of said fan motor; and
   a speed output terminal electrically connected between said speed output module and said computer for outputting said speed signal to said computer.

3. A motor speed control method using in a motor speed detecting device between a motor and a system, wherein said system outputs a PWM signal to said motor for controlling said speed, comprising steps of;
   setting a first predetermined speed of said motor and finding a first frequency of said PWM signal corresponding to said first predetermined speed, wherein said first frequency is a multiple of said first predetermined speed;
   processing a learning process to said motor, wherein said system inputs PWM signals having a constant testing frequency but different duty cycles one by one to said motor and records said speed in response to said different duty cycles for finishing a table recoding a relationship between said duty cycles and said speed; and
   finding a first duty cycle according to said first predetermined speed and said table, and then said system outputting a PWM signal having said first frequency and said first duty cycle to said motor so that said motor works at said first predetermined speed.

4. The method according to claim 3, wherein said testing frequency is not equal to one of said first frequency and a multiple of said first frequency.

5. The method according to claim 3, further comprising steps of:
   setting a second predetermined speed of said motor and finding a second frequency of said PWM signal corresponding to said second predetermined speed, wherein said second frequency is a multiple of said second predetermined speed; and finding a second duty cycle according to said second predetermined speed and said table, and then said system outputting a PWM signal having said second frequency and said second duty cycle to said motor so that said motor works at said second predetermined speed.

6. The method according to claim 5, wherein said testing frequency is not equal to one of said second frequency and a multiple of said second frequency.

7. The method according to claim 3, wherein in said learning process, said system inputs PWM signals having a fixed testing frequency and duty cycles decreasing 4% each time from 100% to said motor one by one and records said speed in response to said duty cycles for finishing a table recording a relationship between said duty cycles and said speed.

8. The method according to claim 3, wherein said motor is a fan motor and said system is a portable computer.

9. A heat dissipating device for a chip of a system, comprising:

a heat sink connected to a surface of said chip for enhancing a heat dissipating efficiency of said chip;

a fan driven by a PWM signal outputted by said system for speeding an air flow around said heat sink;

a first input terminal and a second input terminal, wherein said first and second input terminals are electrically connected respectively to a constant voltage potential and an ground potential for continuously receiving an electrical power;

a third input terminal electrically connected between said fan and said system outputting said PWM signal by referring to a predetermined table recording a relationship between a duty cycle and a speed of said fan, wherein said third input terminal receives said PWM signal sent by said system for controlling speed of said fan.

10. The device according to claim 9, wherein said system is a portable computer.

11. The device according to claim 9, wherein said heat dissipating device further comprises:

a speed output module electrically connected between said first input terminal and said second input terminal for continuously generating said speed signal in response to said speed of said fan; and a speed output terminal electrically connected between said speed output module and said system for outputting said speed signal to said system.

12. A method of controlling a fan speed, comprising steps of:

setting a first predetermined speed of a fan and finding a first frequency of a PWM signal corresponding to said first predetermined speed, wherein said first frequency is a multiple of said first predetermined speed;

processing a learning process to said fan, comprising inputting PWM signals having a constant testing frequency but different duty cycles one by one to said fan and recording said speed in response to said different duty cycles to finish a table of a relationship between said duty cycles and said speed; and finding a first duty cycle according to said first predetermined speed and said table, and then outputting a PWM signal having said first frequency and said first duty cycle to said fan so that said fan works at said first predetermined speed.

13. The method according to claim 12, wherein said testing frequency is not equal to one of said first frequency and a multiple of said first frequency.

14. The method according to claim 12, further comprises steps of:

setting a second predetermined speed of said fan and finding a second frequency of said PWM signal corresponding to said second predetermined speed, wherein said second frequency is a multiple of said second predetermined speed; and finding a second duty cycle according to said second predetermined speed and said table, and then outputting a PWM signal having said second frequency and said second duty cycle to said fan so that said fan works at said second predetermined speed.

15. The method according to claim 14, wherein said test frequency is not equal to one of said second frequency and a multiple of said second frequency.

16. The method according to claim 12, wherein said learning process, further comprises inputting PWM signals having a fixed testing frequency and duty cycles decreasing 4% each time from 100% to said fan one by one and recording said speed in response to said duty cycles to finish a table recording a relationship between said duty cycle and said speed.

* * * * *